US010123243B2

(12) United States Patent
Wu

(10) Patent No.: US 10,123,243 B2
(45) Date of Patent: Nov. 6, 2018

(54) DEVICE AND METHOD OF HANDLING TIGHT INTERWORKING OF TWO CELLULAR SYSTEMS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/788,793

(22) Filed: Oct. 19, 2017

(65) Prior Publication Data

US 2018/0115929 A1   Apr. 26, 2018

Related U.S. Application Data

(60) Provisional application No. 62/410,860, filed on Oct. 21, 2016.

(51) Int. Cl.
| | |
|---|---|
| H04W 36/00 | (2009.01) |
| H04W 76/30 | (2018.01) |
| H04W 76/16 | (2018.01) |
| H04W 72/04 | (2009.01) |
| H04W 12/04 | (2009.01) |
| H04W 12/10 | (2009.01) |

(52) U.S. Cl.
CPC ..... *H04W 36/0066* (2013.01); *H04W 72/048* (2013.01); *H04W 76/16* (2018.02); *H04W 76/30* (2018.02); *H04W 12/04* (2013.01); *H04W 12/10* (2013.01)

(58) Field of Classification Search
CPC .......................................... H04W 36/00–36/385
USPC .......... 455/436–444; 370/321–334, 328–330
See application file for complete search history.

(56) References Cited

U.S. PATENT DOCUMENTS

2012/0063419 A1*   3/2012   Zhao ................... H04W 24/04
370/331

FOREIGN PATENT DOCUMENTS

EP         3041310 A1      7/2016

OTHER PUBLICATIONS

Search Report dated Mar. 12, 2018 for EP application No. 17197657.4, pp. 1-20.
Industrial Technology Research Institute, "5G-NR (New Radio) in 3GPP from RAN2 point of view", Sep. 9, 2016, XP055453825, pp. 1-65.
3GPP TS 37.340 V0.4.0, Aug. 2017.
(Continued)

*Primary Examiner* — Ronald Eisner
(74) *Attorney, Agent, or Firm* — Winston Hsu

(57) ABSTRACT

A communication device for handling a first radio access technology (RAT) and second RAT tight interworking comprises a storage device for storing instructions and a processing circuit coupled to the storage device. The processing circuit is configured to execute the instructions stored in the storage device. The instructions comprise connecting to a first base station (BS) via a first RAT; receiving a first message of the first RAT from the first BS, wherein the first message includes a second message of a second RAT, and the second message configures the communication device to connect to a second BS via the second RAT; transmitting a first response message to the first BS; connecting to the second BS; and communicating second data with the second BS according to a configuration of the second RAT, when communicating first data with the first BS.

7 Claims, 7 Drawing Sheets

(56) References Cited

OTHER PUBLICATIONS

Search Report dated Jun. 25, 2018 for EP application No. 17197657. 4, pp. 1-7.
3GPP TS 36.331 V14.0.0 (Sep. 2016), "3rd Generation Partnership Project; Technical Specification Group Radio Access Network; Evolved Universal Terrestrial Radio Access (E-UTRA); Radio Resource Control (RRC); Protocol specification (Release 14)", XP051172918, pp. 1-644.
ZTE, "Discussion on control plane for the DC based LTE/NR tight interworking", 3GPP TSG RAN WG2 Meeting #94, R2-163741, May 23-27, 2016, Nanjing, China, XP051095713, pp. 1-4.
Chen, ITRI:"5G-NR (New Radio) in 3GPP from RAN2 point of view", 2016, Taiwan, XP055453825, pp. 1-65.

* cited by examiner

DEVICE AND METHOD OF HANDLING TIGHT INTERWORKING OF TWO CELLULAR SYSTEMS

CROSS REFERENCE TO RELATED APPLICATIONS

This application claims the benefit of U.S. Provisional Application No. 62/410,860, filed on Oct. 21, 2016, which is incorporated herein by reference.

BACKGROUND OF THE INVENTION

1. Field of the Invention

The present invention relates to a communication device and a method used in a wireless communication system, and more particularly, to a communication device and a method of handling a tight interworking of two cellular systems.

2. Description of the Prior Art

A long-term evolution (LTE) advanced (LTE-A) includes a carrier aggregation (CA), a Dual Connectivity (DC), a LTE transmission over an unlicensed spectrum (e.g., LTE-unlicensed (LTE-U) or licensed-assisted access (LAA)).

SUMMARY OF THE INVENTION

The present invention therefore provides a communication device and method for handling a tight interworking of two cellular systems to solve the abovementioned problem.

A communication device for handling a first radio access technology (RAT) and second RAT tight interworking comprises a storage device for storing instructions and a processing circuit coupled to the storage device. The processing circuit is configured to execute the instructions stored in the storage device. The instructions comprise connecting to a first base station (BS) via a first RAT; receiving a first message of the first RAT from the first BS via the first RAT, wherein the first message includes a second message of a second RAT and a first transaction identifier (TI), and the second message configures the communication device to connect to a second BS via the second RAT and includes a second TI; transmitting a first response message to the first BS via the first RAT in response to the first message, wherein the first response message includes the first TI and a second response message, and the second response message includes the second TI; connecting to the second BS via the second RAT in response to the second message; and communicating second data via the second RAT with the second BS according to a configuration of the second RAT in the second message, when communicating first data via the first RAT with the first BS.

A communication device for handling a first RAT and second RAT tight interworking comprises a storage device for storing instructions and a processing circuit coupled to the storage device. The processing circuit is configured to execute the instructions stored in the storage device. The instructions comprise connecting to a first BS via a first RAT; receiving a message from the first BS via the first RAT; determining that the message configures the communication device to perform the first RAT and second RAT tight interworking or to perform an inter-RAT handover from the first RAT to a second RAT; transmitting a first response message to the first BS via the first RAT in response to the message, connecting to a second BS via the second RAT in response to the message, transmitting a second response message of the second RAT to the second BS in response to the message and communicating second data via the second RAT with the second BS when communicating first data via the first RAT with the first BS, when determining that the message configures the communication device to perform the first RAT and second RAT tight interworking; and not transmitting the first response message to the first BS, disconnecting from the first RAT, connecting to the second BS via the second RAT in response to the message, transmitting a third response message of the second RAT to the second BS via the second RAT in response to the message and communicating third data via the second RAT with the second BS, when determining that the message configures the communication device to perform the inter-RAT handover from the first RAT to the second RAT.

A method of handling a first RAT and second RAT tight interworking comprises a first BS of a network connecting to a communication device via a first RAT; the first BS receiving a second message of a second RAT from a second BS of the network, wherein the second message includes a second TI; the first BS transmitting a first message of the first RAT to the communication device via the first RAT, wherein the first message includes the second message and a first TI, and the second message configures the communication device to connect to the second BS via the second RAT; the first BS receiving a first response message of the first RAT from the communication device via the first RAT in response to the first message, wherein the first response message includes a second response message of the second RAT and the first TI, and the second response message includes the second TI; the second BS receiving the second response message from the first BS in response to the second message; and the second BS communicating second data via the second RAT with the communication device according to a configuration of the second RAT in the second message, when the first BS communicates first data via the first RAT with the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
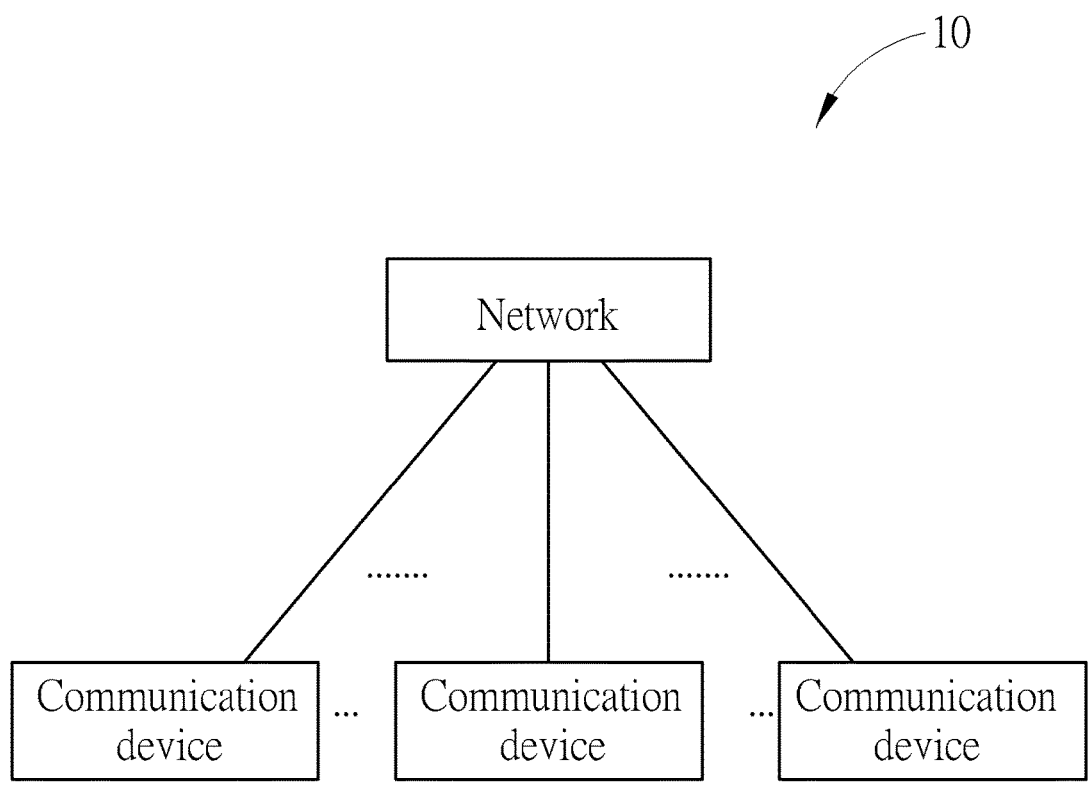
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., one or multiple carriers) belonging to one or multiple base station (BS). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB). The network may be a fifth generation (5G) network including at least one 5G BS which employs orthogonal frequency-division multiplexing (OFDM) and/or non-OFDM and a transmission time interval (TTI) shorter than 1 ms (e.g. 1, 2, 3 or 4 OFDM symbols and 100 or 200 microseconds), to communicate with the communication devices. In general, a BS may also be used to refer any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

A long-term evolution (LTE) and new radio (NR) tight interworking of a 5G (e.g., NR) communication technology is discussed in 3rd Generation Partnership Project (3GPP). In one example, the UE simultaneously connects to a LTE BS (i.e., eNB) on at least one first carrier for a LTE communication and to a NR BS (i.e., gNB) on at least one second carrier for a NR communication, e.g., a Dual Connectivity (DC) or an inter-BS carrier aggregation (CA). In another example, the UE simultaneously connects to a gNB capable of a LTE communication and a NR communication via a first carrier for the LTE communication and via a second carrier for the NR communication, e.g., an intra-eNB CA. Each of the first carrier and the second carrier may belong to a licensed spectrum or an unlicensed spectrum. However, it is not clear how to realize the LTE and NR tight interworking.

Besides the LTE and NR tight interworking described above, the UE may be handed over from a LTE radio access technology (RAT) to a NR RAT or from the NR RAT to the LTE RAT, i.e., inter-RAT handover. In one example, the UE only connecting to an eNB or simultaneously connecting to an eNB and a gNB receives an inter-RAT handover command indicating the UE to handover to a gNB. In response to the inter-RAT handover command, the UE does not connect to the eNB. In one example, the UE only connecting to a gNB or simultaneously connecting to an eNB and a gNB receives an inter-RAT handover command indicating the UE to handover to an eNB. In response to the inter-RAT handover command, the UE does not connect to the gNB.

Figure 2:
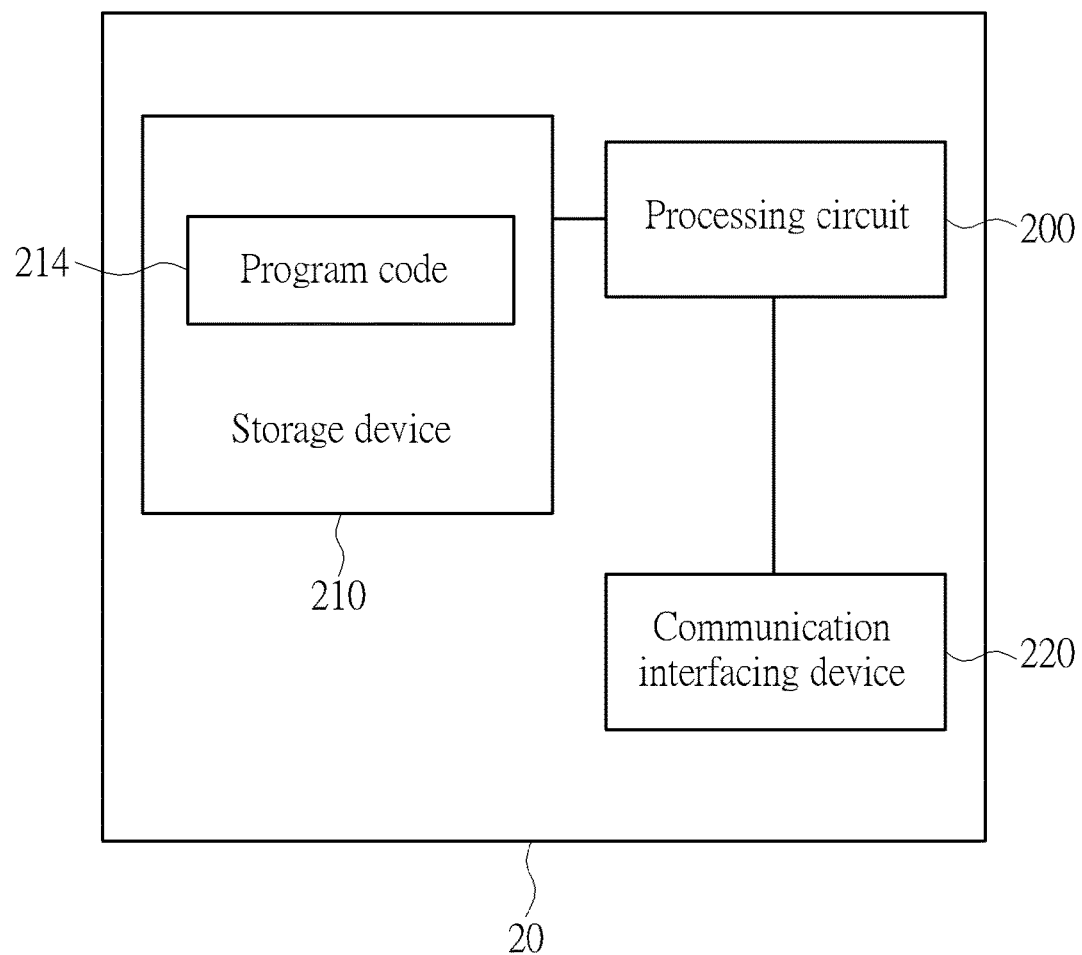
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein.

The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing device 220 includes at least one transceiver and is used to transmit and receive signals (e.g., data, messages and/or packets) according to processing results of the processing circuit 200.

In the following embodiments, a UE is used for representing a communication device in FIG. 1, to simplify the illustration of the embodiments.

Figure 3:
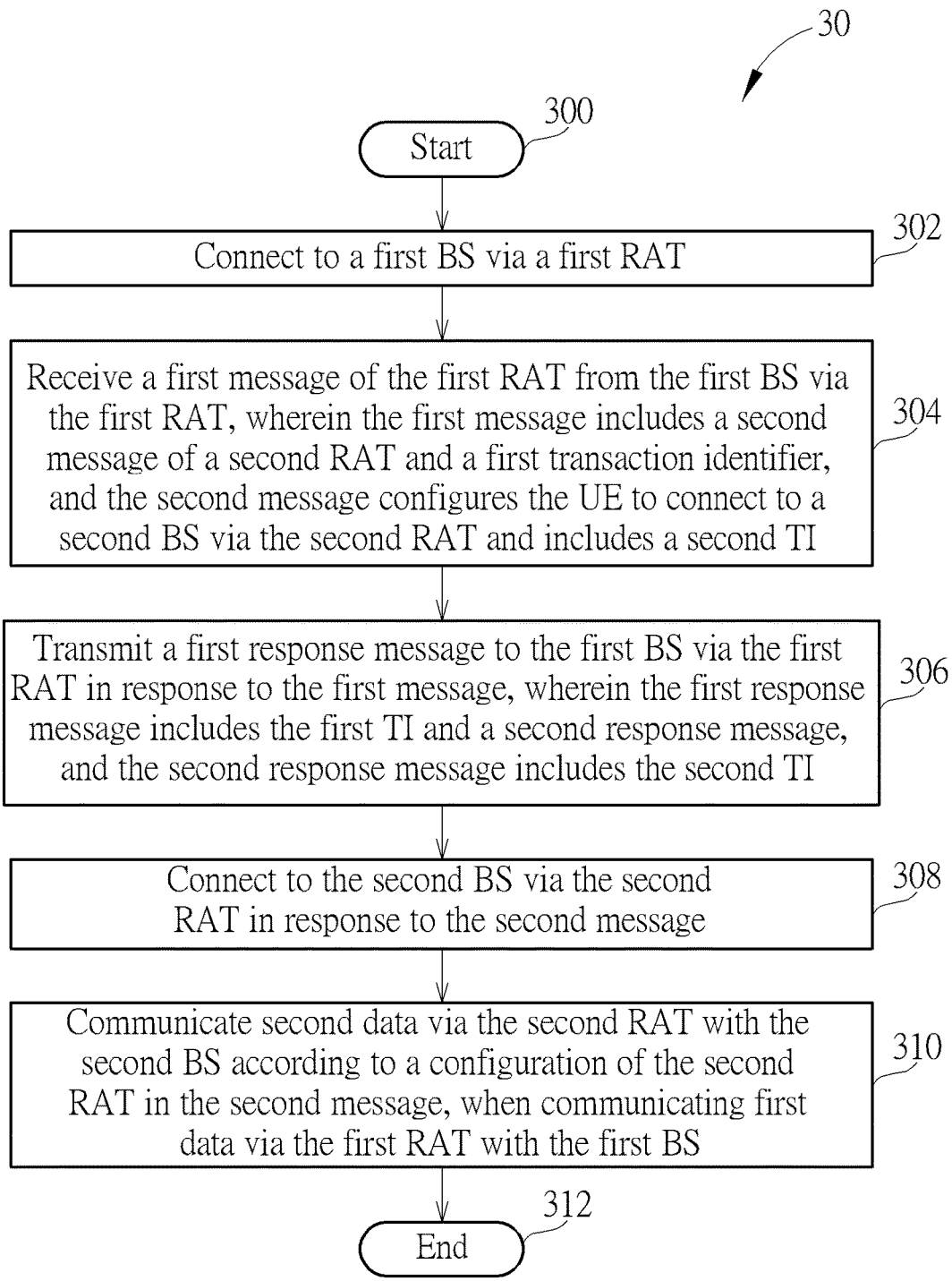
FIG. 3 is a flowchart of a process according to an example of the present invention.

FIG. 3 is a flowchart of a process 30 according to an example of the present invention. The process 30 is utilized in a UE, to handle a first RAT and second RAT tight interworking. The process 30 includes the following steps:

Step 300: Start.

Step 302: Connect to a first BS via a first RAT.

Step 304: Receive a first message of the first RAT from the first BS via the first RAT, wherein the first message includes a second message of a second RAT and a first transaction identifier (TI), and the second message configures the UE to connect to a second BS via the second RAT and includes a second TI.

Step 306: Transmit a first response message to the first BS via the first RAT in response to the first message, wherein the first response message includes the first TI and a second response message, and the second response message includes the second TI.

Step 308: Connect to the second BS via the second RAT in response to the second message.

Step 310: Communicate second data via the second RAT with the second BS according to a configuration of the second RAT in the second message, when communicating first data via the first RAT with the first BS.

Step 312: End.

According to the process 30, the first RAT and second RAT tight interworking can be realized according to the above description. The first BS identifies a transaction with the UE according to the first TI, and the second BS identifies a transaction with the UE according to the second TI.

Realization of the process 30 is not limited to the above description. The following examples may be applied to the process 30.

In one example, when the UE communicates with the first RAT and the second RAT according to the process 30, the UE receives a third message of the first RAT from the first BS via the first RAT, wherein the third message includes a fourth message of the second RAT, and the fourth message configures the UE to connect to a third BS via the second RAT. Then, the UE transmits a third response message to the first BS via the first RAT in response to the third message. Accordingly, the UE connects to the third BS via the second RAT in response to the fourth message. The UE may include a fourth response message of the second RAT in the third response message. The third message and the third response message may include a third TI. The fourth message and fourth response message may include a fourth TI. The UE communicates (e.g., transmits or receives) fourth data via the second RAT with the third BS according to a configuration of the second RAT in the fourth message, when communicating third data via the first RAT with the first BS.

In one example, the first BS, the second BS and the third BS are a same BS or different BSs. In one example, a first container (e.g., a first information element (IE)) defined in the first message includes the second message, and a second container (e.g., a second IE) defined in the third message includes the fourth message. In one example, the first BS sets a first value of the first TI in the first message, and the UE uses the first value of the first TI in the first response message. The second BS sets a second value of the second TI in the second message, and the UE uses the second value of the second TI in the second response message. The first BS sets a third value of the third TI in the third message, and the UE uses the third value of the third TI in the third response message. The second BS sets a fourth value of the fourth TI in the fourth message, and the UE uses the fourth value of the fourth TI in the fourth response message. In one example, the first BS and the second BS set the first value and the second value independently. The first BS and the third BS set the third value and the fourth value independently. That is, a TI value determined by a BS has no correlation with a TI value determined by another BS.

In one example, the first data and the third data include a first plurality of protocol data units (PDUs) of the first RAT, and the second data and the fourth data include a second plurality of PDUs of the second RAT. The UE does not transmit the second response message to the second BS directly. The UE does not transmit the fourth response message to the third BS directly.

In one example, the first message, the first response message, the third message and the third response message are LTE radio resource control (RRC) messages, and the second message, the second response message, the fourth message and the fourth response message are NR/5G RRC messages. In one example, the first message and the third message are LTE RRC Connection Reconfiguration messages, and the first response message and the third response message are LTE RRC Connection Reconfiguration Complete messages. In one example, the first message and the third message are LTE RRC messages defined for a LTE and NR tight interworking, and the first response message and the third response message are LTE RRC response messages defined for the LTE and NR tight interworking. In one example, the second message and the fourth message are NR/5G RRC Connection Reconfiguration messages, and the second response message and the fourth response message are NR/5G RRC Connection Reconfiguration Complete messages. In one example, the second message and the fourth message are NR/5G RRC messages defined for the LTE and NR tight interworking, and the second response message and the fourth response message are NR/5G RRC response messages defined for the LTE and NR tight interworking.

In one example, the first data and the third data include at least one of a plurality of LTE PDUs (e.g., Media Access Control (MAC), Radio Link Control (RLC) or Packet Data Convergence Protocol (PDCP) PDUs) and control information on at least one LTE physical control channel (e.g., Physical UL Control Channel (PUCCH), Physical DL Control Channel (PDCCH), Physical Random Access Channel (PRACH)), and the second data and the fourth data include at least one of a plurality of NR/5G PDUs (e.g., MAC, RLC or PDCP PDUs) and control information on at least one NR/5G physical control channel (e.g., PUCCH, PDCCH or PRACH).

In one example, the first message, the first response message, the third message and the third response message are NR/5G RRC messages, and the second message, the second response message, the fourth message and the fourth response message are LTE RRC messages. In one example, the first message and the third message are NR/5G RRC Connection Reconfiguration messages, and the first response message and the third response message are NR/5G RRC Connection Reconfiguration Complete messages. In one example, the first message and the third message are NR/5G RRC messages defined for a LTE and NR tight interworking, and the first response message and the third response message are NR/5G RRC response messages defined for the LTE and NR tight interworking. In one example, the second message and the fourth message are LTE RRC Connection Reconfiguration messages, and the second response message and the fourth response message are LTE RRC Connection Reconfiguration Complete messages. In one example, the second message and the fourth message are LTE RRC messages defined for the LTE and NR tight interworking, and the second response message and the fourth response message are LTE RRC response messages defined for the LTE and NR tight interworking.

In one example, the first data and the third data include at least one of a plurality of NR/5G PDUs (e.g., MAC, RLC or PDCP PDUs) and control information on at least one NR/5G physical control channel (e.g., PUCCH, PDCCH, PRACH), and the second data and the fourth data include at least one of a plurality of LTE PDUs (e.g., MAC, RLC or PDCP PDUs) and control information on at least one LTE physical control channel (e.g., PUCCH, PDCCH, PRACH).

In one example, the UE performs a random access procedure to the second BS or the third BS before or after transmitting the second response message or the fourth response message, when connecting to the second BS or the third BS. The second message and the fourth message include a random access configuration for the UE to perform the random access procedure according to the random access configuration.

In one example, a connection between the first BS and the second BS or a connection between the first BS and the third BS is not secured. The second BS or the third BS performs at least one of an integrity protection and a ciphering on the second or fourth message according to at least one security key (e.g., key(s) for an integrity protection/an integrity protection check and key(s) for a ciphering (e.g., an encryption)/a deciphering (e.g., a decryption)). The UE deciphers the second or fourth message according to the key(s) for the ciphering/the deciphering and performs an integrity protection check on the second or fourth message (e.g., checks the integrity code is correct or not) according to the key(s) for the integrity protection/the integrity protection check. The UE performs the at least one of the integrity protection and the ciphering on the second or fourth response message according to the at least one security key.

In one example, the second BS or third BS does not perform the integrity protection and the ciphering on the second message or the fourth message. The UE does not perform the integrity protection and the ciphering on the second response or fourth response message.

In one example, the first BS performs at least one of an integrity protection and a ciphering on the first or third message according to at least one security key (e.g., key(s) for an integrity protection/an integrity protection check and key(s) for a ciphering/a deciphering). The UE deciphers the first or third message according to the key(s) for the ciphering/the deciphering and performs an integrity protection check on the first or third message (e.g., checks the integrity code is correct or not) according to the key(s) for the integrity protection/the integrity protection check.

The UE performs the at least one of the integrity protection and the ciphering on the first or third response message according to the at least one security key. The first BS deciphers the first or third response message, performs an integrity protection check on the first or third response message and transmits the second or fourth response message to the second BS via the connection between the first BS and the second BS or to the third BS via the connection between the first BS and the third BS.

In one example, the UE receives a message from the second or third BS via the second RAT and transmits a response message responding the message via the second RAT to the second or third BS. The second or third BS performs the integrity protection and the ciphering on the message according to at least one security key (e.g., key(s) for an integrity protection/an integrity protection check and key(s) for a ciphering (e.g., an encryption)/a deciphering (e.g., a decryption)) used between the UE and the second or third BS. The UE performs the at least one of the integrity protection (e.g., generates an integrity code from the response message) and the ciphering on the response message according to the at least one security key (e.g., key(s) for an integrity protection/an integrity protection check and key(s) for a ciphering (e.g., an encryption)/a deciphering (e.g., a decryption)) used between the UE and the second or third BS. The UE performs at least one of a deciphering and an integrity protect check on the message according to the at least one security key. The second or third BS performs at least one of a deciphering and an integrity protect check on the response message according to the at least one security key. In one example, the message and the response message are LTE RRC messages or NR/5G RRC messages as described above.

In one example, the UE receives a fifth message of the first RAT from the first BS via the first RAT, wherein the fifth message indicates a release of the connection between the UE and the second BS. The UE transmits a fifth response message to the first BS via the first RAT in response to the fifth message. The UE stops communicating (e.g., transmitting or receiving) with the second BS in response to a release request message.

In one example, the fifth message and the fifth response message include a fifth TI. The first BS sets a fifth value of the fifth TI in the fifth message, and the UE uses the fifth value of the fifth TI in the fifth response message. In one example, the fifth message and the fifth response message are LTE RRC messages or NR/5G RRC messages. The details of the LTE RRC messages and the NR/5G RRC messages can be referred to the previous description, and are not narrated herein.

In one example, the first RAT is a LTE RAT (or called evolved universal terrestrial radio access (E-UTRA)), and the second RAT is a NR/5G RAT. In one example, the first BS is an eNB of a LTE RAT, and the second BS and the third BS are gNBs of a NR/5G RAT. In one example, the first RAT is a NR/5G RAT, and the second RAT is a LTE RAT. In one example, the first BS is a gNB of a NR/5G RAT, and the second BS and the third BS are eNBs of a LTE RAT.

In one example, the configuration of the second RAT includes at least one of a Physical configuration, a MAC configuration, a RLC configuration and a PDCP configuration. For example, the physical configuration includes a transmission power configuration for a physical channel, a Hybrid Automatic Repeat Request (HARQ) feedback (e.g., ACK/NAK) configuration, a channel state information (CSI) configuration, a reference signal configuration (e.g., a CSI reference signal), a physical DL control channel configuration (e.g., a frequency location of the physical control channel, a resource allocation unit or a resource allocation start position/offset), a physical UL control channel configuration, a physical DL shared channel (PDSCH) configuration, a physical UL shared channel (PUSCH) configuration, a beam forming configuration, a Multi-input Multi-output (MIMO) configuration, a transmission mode configuration or a time-division duplexing (TDD) configuration. In one example, the MAC configuration includes at least one of a timer or counter value for a MAC function (e.g., a buffer status reporting, a power headroom reporting or a HARQ), parameters for a logical channel prioritization, a semi-persistent scheduling (SPS) configuration and a length for a field (e.g., length indicator) used in a MAC PDU. In one example, the RLC configuration includes a logical channel configuration (e.g., a logical channel identity or a logical channel priority), a timer or counter value for a RLC function (e.g., an ARQ, a reordering) or a length value for a field (e.g., a sequence number). In one example, the PDCP configuration includes a timer or counter value for a PDCP function (e.g., an ARQ or a reordering) or a length value for a field (e.g., a sequence number).

In one example, the configuration of the second RAT includes a cell addition configuration. For example, the cell addition configuration indicates a first cell (or a first component carrier (CC)) of the second BS. The UE connects to the first cell (or the first CC) according to the cell addition configuration. In one example, the configuration of the second RAT includes a cell removal configuration. For example, the UE connects to a second cell (or a second CC) of the second BS, and the cell removal configuration configures the UE to disconnect from the first cell (or the first CC).

Figure 4:
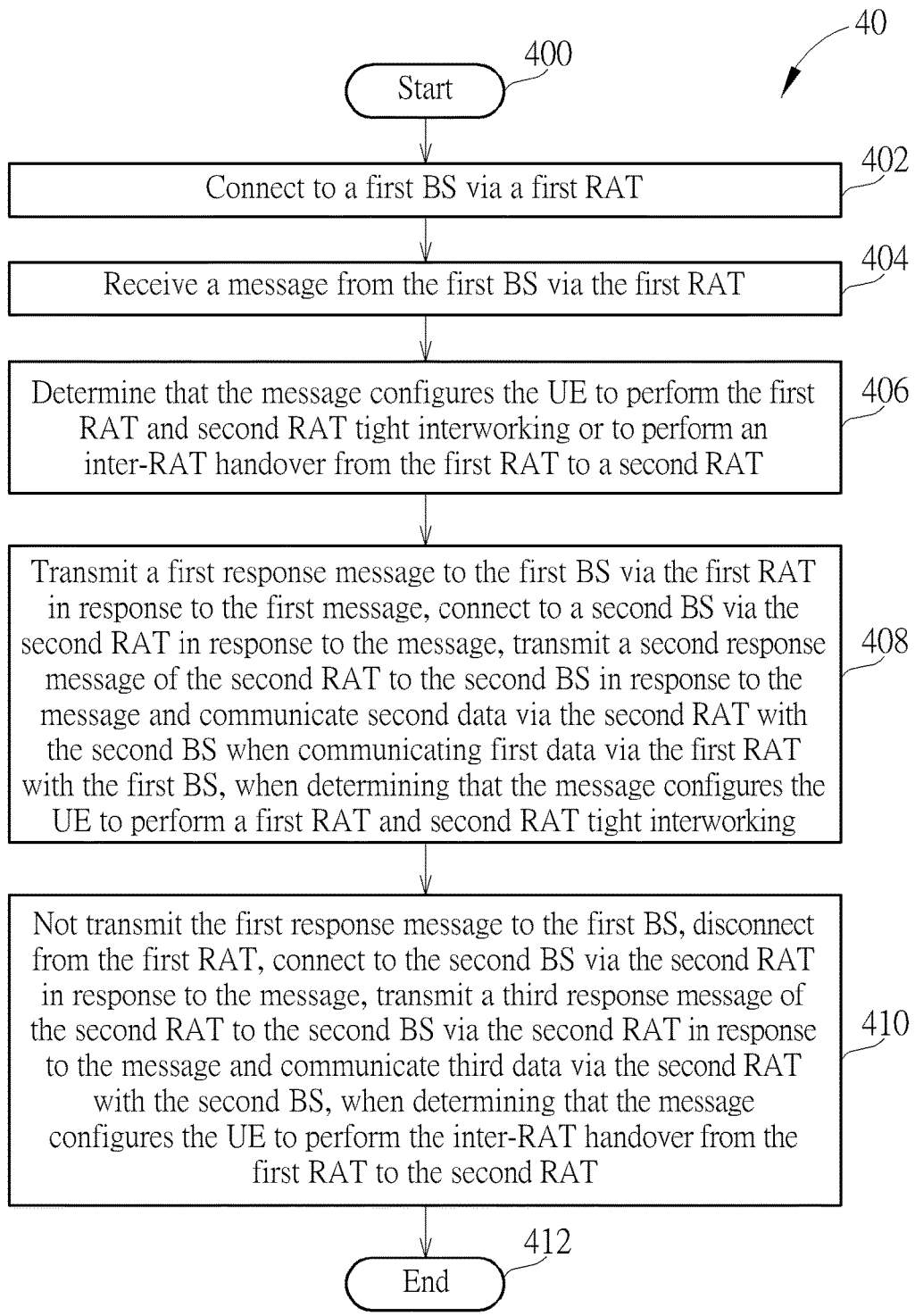
FIG. 4 is a flowchart of a process according to an example of the present invention.

FIG. 4 is a flowchart of a process 40 according to an example of the present invention. The process 40 is utilized in a UE, to handle a first RAT and second RAT tight interworking. The process 40 includes the following steps:

Step 400: Start.

Step 402: Connect to a first BS via a first RAT.

Step 404: Receive a message from the first BS via the first RAT.

Step 406: Determine that the message configures the UE to perform the first RAT and second RAT tight interworking or to perform an inter-RAT handover from the first RAT to a second RAT.

Step 408: Transmit a first response message to the first BS via the first RAT in response to the first message, connect to a second BS via the second RAT in response to the message, transmit a second response message of the second RAT to the second BS in response to the message and communicate second data via the second RAT with the second BS when communicating first data via the first RAT with the first BS, when determining that the message configures the UE to perform the first RAT and second RAT tight interworking.

Step 410: Not transmit the first response message to the first BS, disconnect from the first RAT, connect to the second BS via the second RAT in response to the message, transmit a third response message of the second RAT to the second BS via the second RAT in response to the message and communicate third data via the second RAT with the second BS, when determining that the message configures the UE to perform the inter-RAT handover from the first RAT to the second RAT.

Step 412: End.

Realization of the process 40 is not limited to the above description. The following examples may be applied to the process 40. Examples related to the process 30 may be applied to the process 40, and are not narrated herein.

In one example, the message includes at least one of a first TI, a second TI and a third TI, the first response message includes the first TI, the second response message includes the second TI, and the third response message includes the third TI. In one example, the first BS sets a first value of the first TI in the message, and the UE uses the first value of the first TI in the first response message. In one example, the second BS sets a second value of the second TI in the message, and the UE uses the second value of the second TI in the second response message. In one example, the second BS sets a third value of the third TI in the message, and the UE uses the third value of the third TI in the third response message. In one example, the first BS and the second BS set the first value and the second value independently and set the first value and the third value independently.

Figure 5:
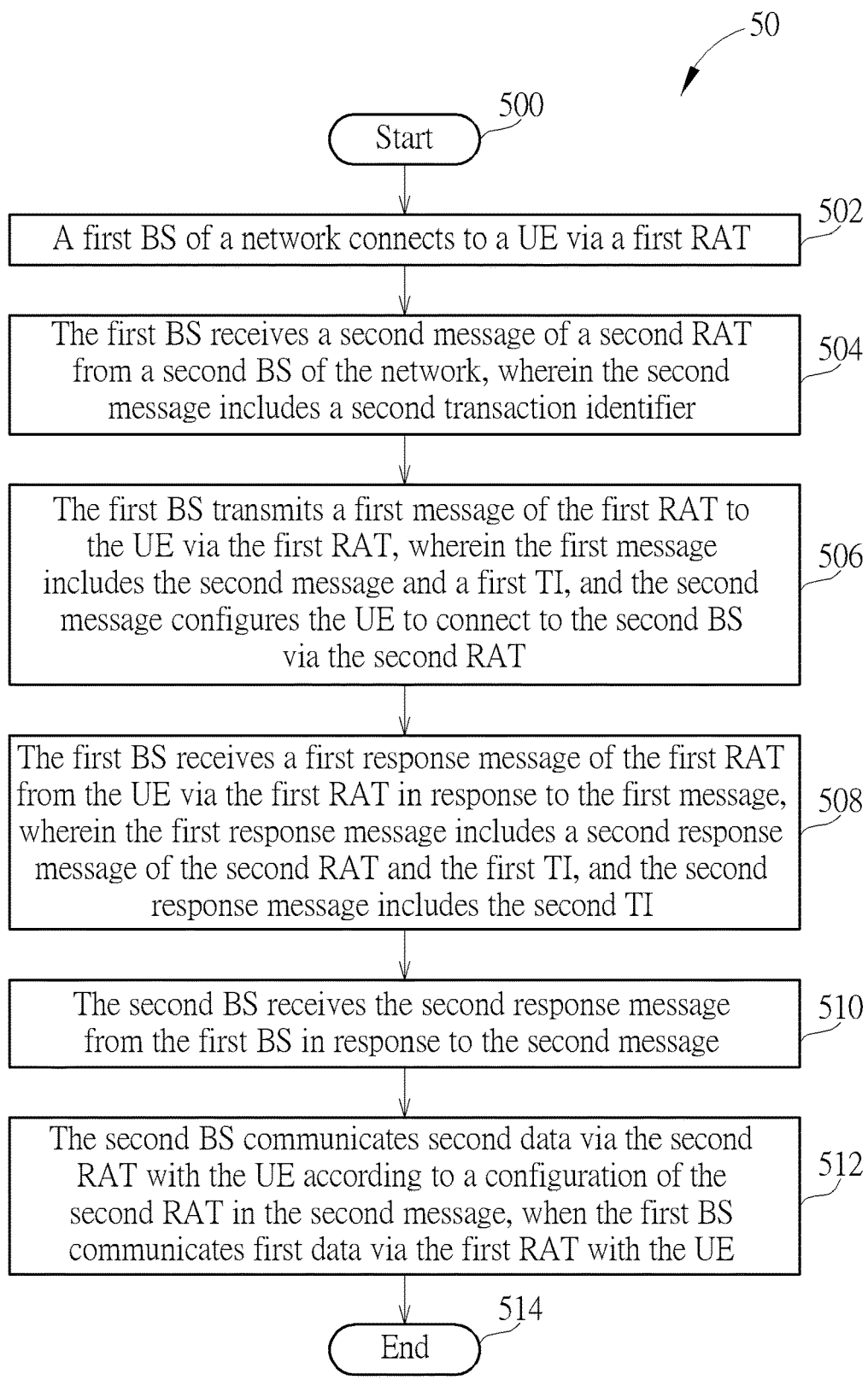
FIG. 5 is a flowchart of a process according to an example of the present invention.

FIG. 5 is a flowchart of a process 50 according to an example of the present invention. The process 50 is utilized in a network, to handle a first RAT and second RAT tight interworking. The process 50 includes the following steps:

Step 500: Start.

Step 502: A first BS of a network connects to a UE via a first RAT.

Step 504: The first BS receives a second message of a second RAT from a second BS of the network, wherein the second message includes a second transaction identifier (TI).

Step 506: The first BS transmits a first message of the first RAT to the UE via the first RAT, wherein the first message includes the second message and a first TI, and the second message configures the UE to connect to the second BS via the second RAT.

Step 508: The first BS receives a first response message of the first RAT from the UE via the first RAT in response to the first message, wherein the first response message includes a second response message of the second RAT and the first TI, and the second response message includes the second TI.

Step 510: The second BS receives the second response message from the first BS in response to the second message.

Step 512: The second BS communicates second data via the second RAT with the UE according to a configuration of the second RAT in the second message, when the first BS communicates first data via the first RAT with the UE.

Step 514: End.

Examples related to the process 30 may be applied to the process 50, and are not narrated herein. Realization of the process 50 is not limited to the above description. The following examples may be applied to the process 50.

In one example, the first BS transmits an addition request message for the UE to the second BS, to request the second BS to communicate data with the UE, before receiving the second message of the second RAT from the second BS. In response to the addition request message, the second BS transmits the second message to the first BS. When the first BS receives the second message, the first BS includes the second message in the first message. The first BS may configure the UE to report a signal strength/quality of the second BS. The first BS may determine to transmit the addition request message, when the signal strength/quality of the second BS is better than a threshold predetermined by the first BS.

In one example, when the second BS connects to the UE via the second RAT, the first BS receives a fourth message of the second RAT from a third BS of the network. The first BS transmits a third message of the first RAT to the UE via the first RAT, wherein the third message includes the fourth message, and the fourth message configures the UE to connect to the third BS via the second RAT. The first BS receives a third response message of the first RAT responding the third message from the UE via the first RAT. The third BS receives a fourth response message of the second RAT responding the fourth message from the first BS. The third BS communicates fourth data via the second RAT with the UE according to a configuration of the second RAT in the fourth message, when the first BS communicates third data via the first RAT with the UE. The third message and the third response message may include a third TI, and the fourth message and the fourth response message may include a fourth TI, as described above.

In one example, the first BS determines to release a connection between the UE and the second BS. The first BS transmits a release request message to the second BS to indicate the release of the connection in response to the determination. The first BS transmits a fifth message of the first RAT to the UE via the first RAT in response to the determination, wherein the fifth message indicates the release of the connection between the UE and the second BS. The first BS receives a fifth response message responding the fifth message from the UE via the first RAT. The fifth message and the fifth response message may include a fifth TI (i.e., the same TI value). The second BS stops communicating with the UE in response to the release request message. That is, the first BS initiates a release of the connection between the second BS and the UE. The fifth message does not include any message of the second RAT. Furthermore, the release of the connection between the second BS and the UE may be initiated by the second BS.

In another example, the second BS determines to release the connection between the UE and the second BS and transmits a release request message to the first BS in response to the determination. The first BS receives the release request message for indicating the release of the connection between the UE and the second BS. The second BS stops communicating with the UE in response to the release request message/the determination. The first BS transmits a sixth message of the first RAT to the UE via the first RAT in response to the release request message/the determination, wherein the sixth message indicates the release of the connection between the UE and the second BS. The first BS receives a sixth response message of the first RAT responding the sixth message from the UE via the first RAT. The sixth message and the sixth response message may include a sixth TI (i.e., the same TI value). In one example, the sixth message and the sixth response message are LTE RRC messages or NR/5G RRC messages. The details of the LTE RRC messages and the NR/5G RRC messages can be referred to the previous description, and are not narrated herein.

The examples for the process 50 can be referred to the previous description related to the process 30, and are not narrated herein.

Figure 6:
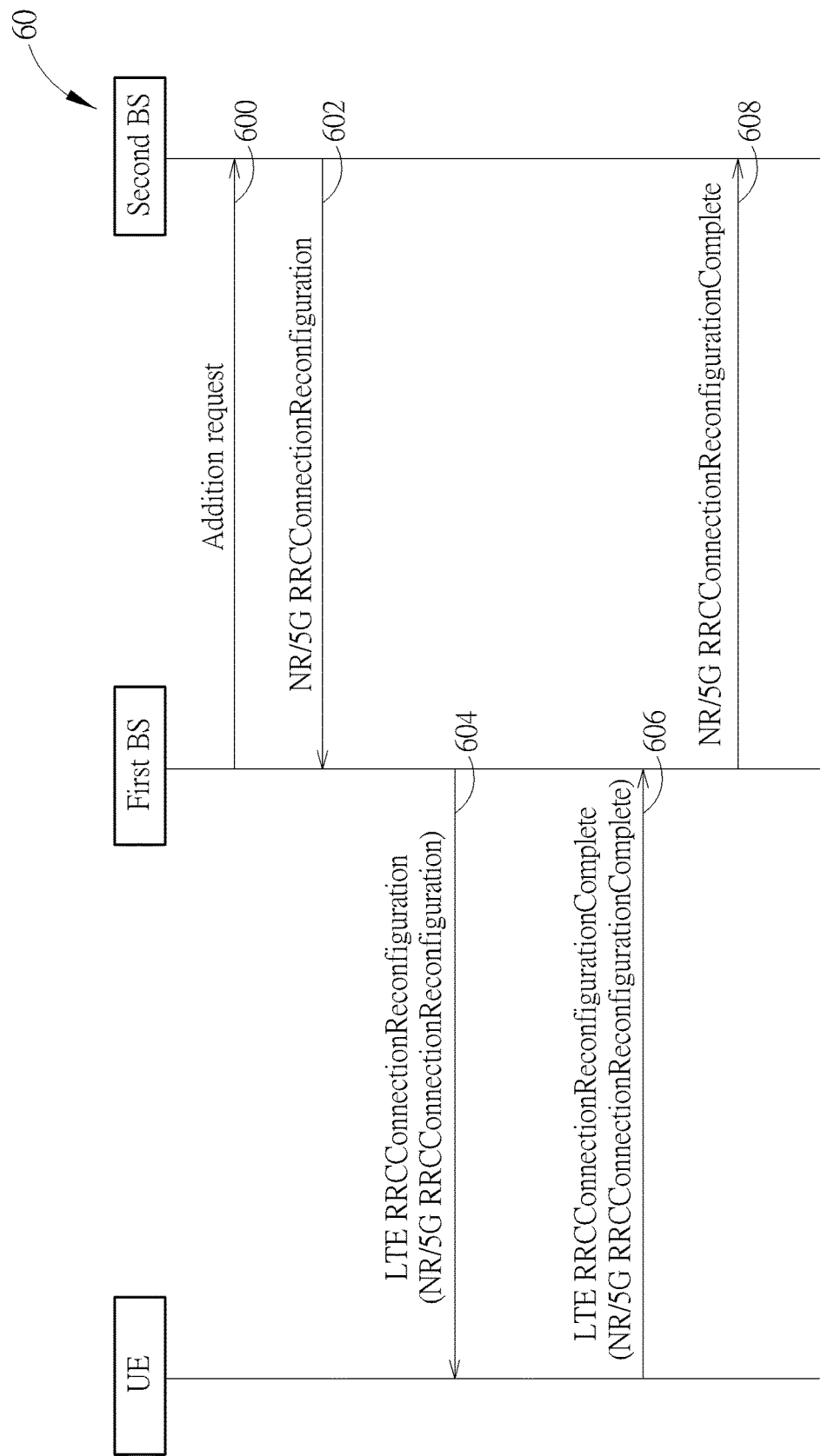
FIG. 6 is a schematic diagram of an addition procedure according to an example of the present invention.

FIG. 6 is a schematic diagram of an addition procedure 60 according to an example of the present invention. Operations of a UE, a first BS (e.g., eNB) and a second BS (e.g., gNB) in FIG. 6 are described as follows. The UE communicates with the first BS via a first RAT (e.g., a LTE RAT), and communicates with the second BS via a second RAT (e.g., a NR/5G RAT). The first BS communicates with the second BS via the second RAT. The first BS transmits an addition request message for the UE to the second BS (Step 600). The second BS transmits a NR/5G RRC Connection Reconfiguration message to the first BS in response to the addition request message (Step 602). The first BS transmits a LTE RRC Connection Reconfiguration message to the UE in response to the reception of the NR/5G RRC Connection Reconfiguration message, wherein the LTE RRC Connection Reconfiguration message includes the NR/5G RRC Connection Reconfiguration message (Step 604). The UE transmits a LTE RRC Connection Reconfiguration Complete message to the first BS in response to the reception of the LTE RRC Connection Reconfiguration message (Step 606). Accordingly, the UE can configure a connection between the second BS and the UE via the second RAT in response to the NR/5G RRC Connection Reconfiguration message. The first BS transmits the NR/5G RRC Connection Reconfiguration Complete message to the second BS in response to the reception of the NR/5G RRC Connection Reconfiguration message (Step 608).

Figure 7:
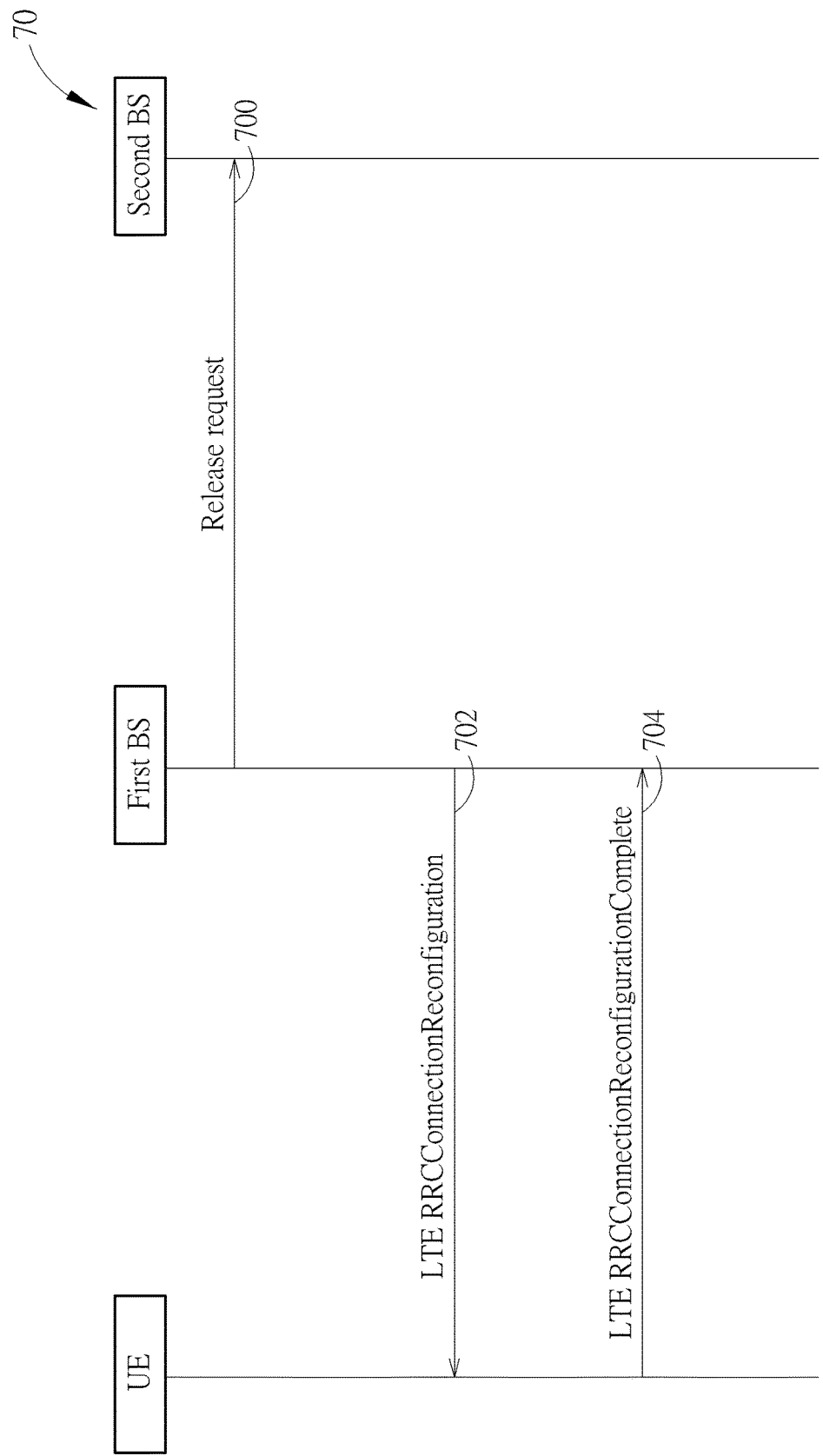
FIG. 7 is a schematic diagram of a release procedure according to an example of the present invention.

FIG. 7 is a schematic diagram of a release procedure 70 according to an example of the present invention. Operations of a UE, a first BS (e.g., eNB) and a second BS (e.g., gNB) in FIG. 7 are described as follows. The UE communicates with the first BS via a first RAT (e.g., a LTE RAT), and the first BS communicates with the second BS via a second RAT (e.g., a NR/5G RAT). The first BS transmits a release request message for indicating a release of the connection between the second BS and the UE to the second BS (Step 700). The first BS transmits a LTE RRC Connection Reconfiguration message to the UE (Step 702). The UE transmits a LTE RRC Connection Reconfiguration Complete message to the first BS in response to the reception of the LTE RRC Connection Reconfiguration message (Step 704). Accordingly, the UE can release the connection between the second BS and the UE in response to the LTE RRC Connection Reconfiguration message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a tight interworking of two cellular systems. The communication device connects to the second BS via the second RAT according to the LTE RRC messages and the NR/5G RRC messages transmitted by the communication device, the first BS and the second BS. Thus, the tight interworking of the two cellular systems can be realized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a first radio access technology (RAT) and second RAT tight interworking, comprising:
   a storage device, for storing instructions of:
      connecting to a first base station (BS) via a first RAT;
      receiving a first message from the first BS via the first RAT, wherein the first message comprises a second message and a first transaction identifier (TI), and the second message configures the communication device to connect to a second BS via the second RAT and comprises a second TI;
      transmitting a first response message to the first BS via the first RAT in response to the first message, wherein the first response message comprises the first TI and a second response message, and the second response message comprises the second TI;
      connecting to the second BS via the second RAT in response to the second message; and
      communicating second data via the second RAT with the second BS according to a configuration of the second RAT in the second message, and communicating, simultaneously with the second data, first data via the first RAT with the first BS; and
   a processing circuit, coupled to the storage device, configured to execute the instructions stored in the storage device.

2. The communication device of claim 1, wherein the storage device further stores the instructions of:
   receiving a third message of the first RAT from the first BS via the first RAT, wherein the third message comprises a fourth message of the second RAT and a third TI, and the fourth message configures the communication device to connect to a third BS via the second RAT and comprises a fourth TI;
   transmitting a third response message to the first BS via the first RAT in response to the third message, wherein the third response message comprises a fourth response message of the second RAT and the third transaction identifier, and the fourth response message comprises the transaction identifier;
   connecting to the third BS via the second RAT in response to the fourth message; and
   communicating fourth data via the second RAT with the third BS according to a configuration of the second RAT in the fourth message, when communicating third data via the first RAT with the first BS.

3. The communication device of claim 1, wherein the first message and the first response message are long-term evolution (LTE) radio resource control (RRC) messages and the second message and the second response message are new radio (NR)/fifth generation (5G) RRC messages; or the first message and the first response message are NR/5G RRC messages and the second message and the second response message are LTE RRC messages.

4. The communication device of claim 1, wherein the first BS deciphers the first response message, performs an integrity protection check on the first response message and transmits the second response message to the second BS via a connection between the first BS and the second BS, when receiving the first response message.

5. The communication device of claim 1, wherein the storage device further stores the instructions of:

performing at least one of an integrity protection and a ciphering on the second response message according to at least one security key.

6. The communication device of claim 1, wherein the storage device further stores the instructions of:

receiving a fifth message of the first RAT from the first BS via the first RAT, wherein the fifth message indicates a release of the connection between the communication device and the second BS;

transmitting a fifth response message to the first BS via the first RAT in response to the fifth message; and stopping communicating with the second BS in response to a release request message.

7. The communication device of claim 1, wherein the configuration of the second RAT comprises at least one of a Physical configuration, a Media Access Control (MAC) configuration, a Radio Link Control (RLC) configuration and a Packet Data Convergence Protocol (PDCP) configuration.

* * * * *